United States Patent [19]
Bilton

[11] 3,747,348
[45] July 24, 1973

[54] HYDRODYNAMIC POWER DRIVES

[75] Inventor: John Bilton, Walton-on-Thames, England

[73] Assignee: Fluidrive Engineering Company Limited, Isleworth, Middlesex, England

[22] Filed: Feb. 16, 1972

[21] Appl. No.: 226,776

[52] U.S. Cl. ............................. 60/351, 60/DIG. 5
[51] Int. Cl. ........................................... F16d 31/10
[58] Field of Search ......................... 60/54, DIG. 5

[56] References Cited
UNITED STATES PATENTS

| | | | |
|---|---|---|---|
| 2,534,517 | 12/1950 | Jenny | 60/54 |
| 2,841,959 | 7/1958 | Snow | 60/54 |
| 3,486,336 | 12/1969 | Bilton | 60/54 |

*Primary Examiner*—Edgar W. Geoghegan
*Attorney*—Raywood H. Blanchard

[57] ABSTRACT

A controllable filling fluid coupling has outlets at the radially outer part of its working circuit periphery for the removal of a cooling flow of working liquid fed into the working circuit when the input is shut down and the output is rotated by the load which is driven from another source of power. The outlets have collecting scoops which face into the vortex which is set up under these conditions. Under normal driving conditions, the liquid in the vortex travels in the opposite direction, i.e. from the input member to the output member at the outer periphery and is not intercepted by the collecting scoops.

9 Claims, 10 Drawing Figures

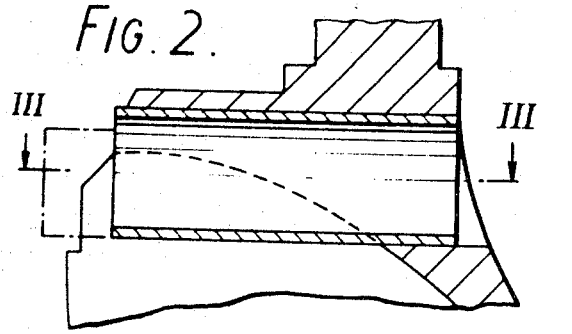
FIG. 2.
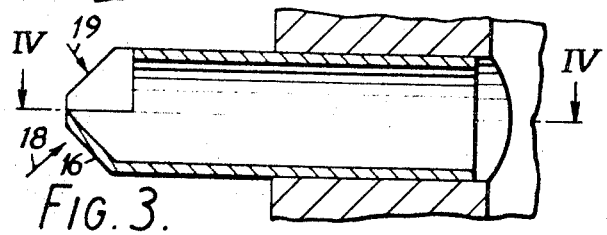
FIG. 3.
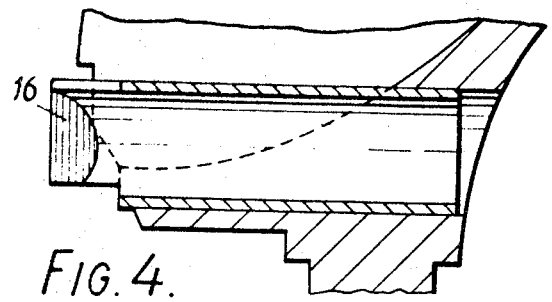
FIG. 4.
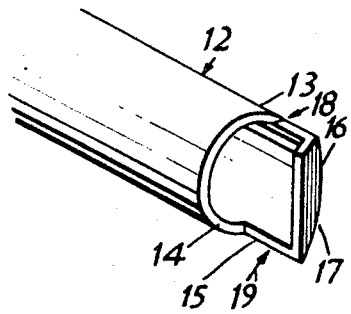
FIG. 5.
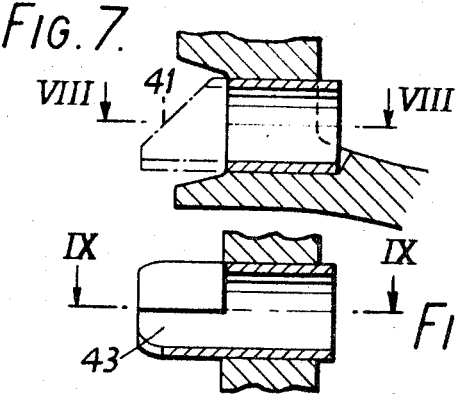
FIG. 7.
FIG. 8.
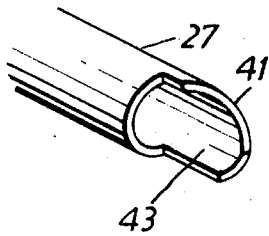
FIG. 10.
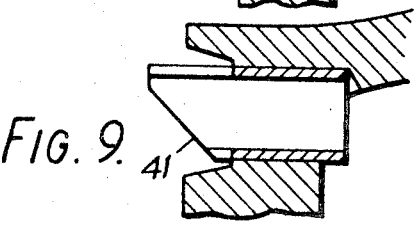
FIG. 9.

HYDRODYNAMIC POWER DRIVES

This invention relates to hydrodynamic power drives of the kind in which power is transmitted from an input rotary member to an output rotary member by a fluid vortex, the fluid following a generally toroidal path around the vortex. Examples of drives of this kind (hereinafter referred to as 'the kind described') are fluid couplings and torque converters.

The invention is concerned with the problems which arise when the input member is stationary and the output member is rotated. This situation can arise for example when two (or more) power units each drive a common load through its individual power drive and one of the power units is shut-down for maintenance while the other power unit continues to drive the load. Even though the shut-down power drive is drained of its working fluid, the air left within the working circuit will itself act as a working fluid to the extent that a torque is transmitted from the output member (which is rotating at the load speed) to the stationary input member. The shut-down power drive is then operating under the equivalent of 100 percent slip and absorbs appreciable power (sometimes) known as "windage" losses) all of which is dissipated within the working circuit in the form of heat. In the case of high power, and especially high speed, installations, the heat generated is considerable. Often, to remove this heat, a small liquid flow is passed through the working circuit of the shut-down power drive. While this can carry away heat generated within the working circuit, it itself increases the torque transmitting characteristics of the working circuit and thus increases both the heat generated within the working circuit and the drag torque which is added to the load driven by the other prime movers.

Except where the cooling liquid flow is so mall as to have negligible cooling effect, these effects of the introduction of the cooling flow tend to be accentuated since the usual means for removing liquid from the working circuit (such as leak off nozzles and scoop tubes) rely on rotation of the input member and the casing structure which rotates with it. Thus, when the input member is stationary, the cooling flow tends to accumulate within the working circuit.

Another example arises in the case of marine drives using a diesel engine driving a propeller shaft through a hydrodynamic drive such as a fluid coupling for normal and maneuvering drives, the marine drive also incorporating a gas turbine which takes over the drive to the propeller shaft under high speed conditions. In such an arrangement, the gas turbine is connected to the propeller by a one-way clutch; when the turbine shaft speed rises above a predetermined value, the one way clutch engages and the hydrodynamic drive between the diesel engine and the propeller shaft is emptied of its working fluid. The propeller shaft speed then rises above the maximum working speed produced by the diesel engine when working without assistance from the gas turbine. The diesel engine is working without load and is therefore stopped while the output member of the hydrodynamic drive is rotated by the gas turbine at a speed which may be twice that at which it is rotated when the diesel engine is driving the propeller shaft. With this arrangement, it will be appreciated that the "windage" heat generated in the hydrodynamic drive is particularly serious.

In accordance with the present invention there is provided a controllable-filling hydrodynamic power drive comprising circuit elements, including an input element and an output element, the circuit elements defining a toroidal working circuit into which a flow of cooling liquid can be fed when the input element is stationary, wherein the boundary wall of the working circuit includes one or more outlets provided with collecting scoops facing into, for interception of, that vortex flow which is set up within the working circuit when the output element is rotating, the input element is stationary and a flow of cooling liquid is supplied to the working circuit.

With this arrangement, the desired cooling flow can be passed through the working circuit when the input is stalled without resulting in a build-up of cooling fluid within the working circuit and consequent increase in heat generation and drag torque.

When the output is rotating at a faster speed than the input, the fluid in the vortex travels around the axis of the hydrodynamic drive in the same direction as when the input is rotating faster than the output. However, the direction in which the fluid travels between the input and output elements is reversed. Thus, the scoops are inactive when the input is rotating faster than the output, i.e. under normal driving conditions.

Preferably, the input element and the output element are adjacent each other at the radially outermost portion of the working circuit and the collecting scoop or scoops is/are located in this portion of the working circuit. The scoop or scoops are then advantageously positioned in the input member.

By way of example, the application of the invention to fluid couplings will now be described by way of example with reference to the accompanying drawings, in which:

FIG. 2 shows a detail of FIG. 1 on an enlarged scale,

FIG. 3 is a section on the line III—III of FIG. 2,

FIG. 4 is a section on the line IV—IV of FIG. 3,

FIG. 5 is a perspective view of an end of the tube shown in FIGS. 2 to 4,

FIG. 7 shows a detail of FIG. 6 on an enlarged scale,

FIGS. 8 and 9 are sections respectively on the lines VIII—VIII and IV—IV of FIGS. 7 and 8, and FIG. 10 is a perspective view of an end of the tube shown in FIGS. 7 to 9.

Figure 1:
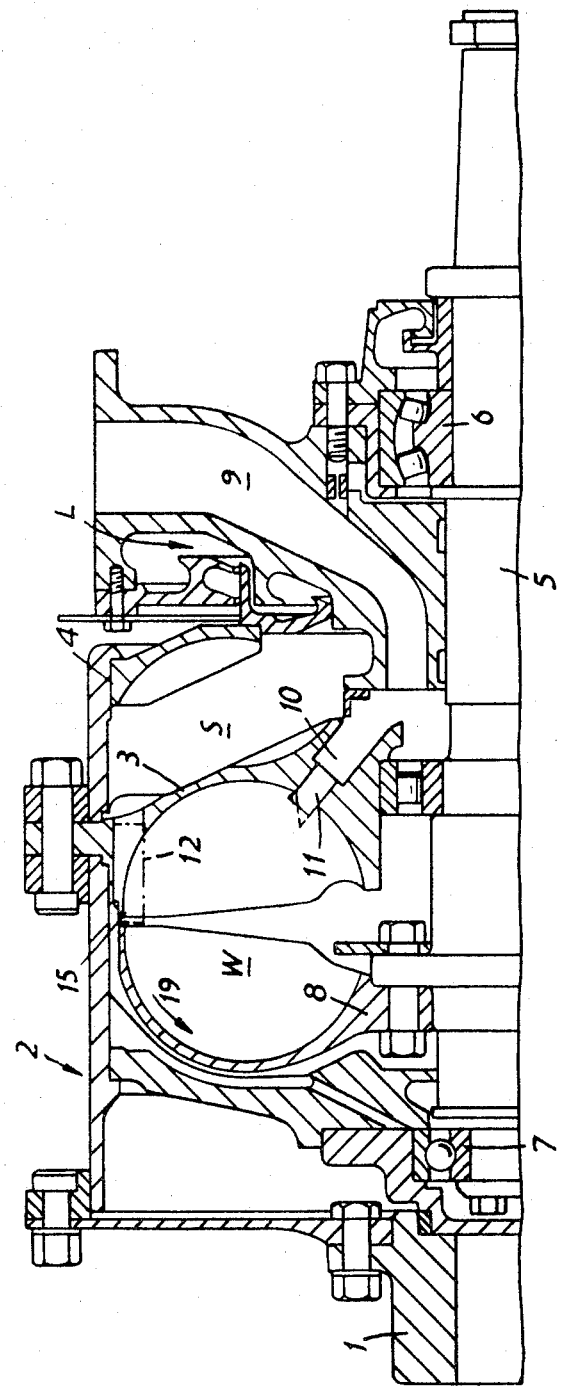
FIG. 1 is an axial sectional view of a single circuit fluid coupling.

The fluid coupling shown in FIG. 1 has an input driving hub 1 carrying an impeller casing 2 which is flanged to an impeller element 3 and a scoop chamber casing 4. An output shaft 5 is mounted in bearings 6 and 7 and carries a runner element 8. The impeller element 3 and runner element 8 are internally vaned and together define a toroidal working circuit W which communicates at its radially outer periphery with the interior of the scoop chamber defined by the scoop chamber casing 4 and the back of the impeller element 3. Working liquid is supplied to the working circuit W through an inlet passage 9 in a stationary part of the coupling, the passage 9 communicating with an annular channel 10 in the radially inner portion of the impeller 3. Working liquid enters the working circuit W from the channel 10 through inlet ports 11 which may be of the shielded kind described in our co-pending British application No. 18571/67. The quantity of working liquid in the working circuit W at any instant is controlled by an adjustable trimming scoop (not shown) which trims off liquid from the scoop chamber in a conventional manner.

Working liquid can pass from the working circuit W to the scoop chamber S through tubes 12 mounted in passages formed in the impeller adjacent the radially outermost portion of the working circuit W. The construction of the tubes 12 is shown in detail in FIGS. 2 to 5. One end 13 of each tube 12 is cut away on one side at 14 so that the entry 15 to the tube 12 from the working circuit has a back wall 16 carrying a segmental plate 17 which is welded on to the curved back wall portion 16 of the tube and forms a scoop.

When the impeller element 3 and the impeller casing 2 are held stationary while the output shaft 5 and runner 8 are rotated by the load, which is now being driven by some other source, a small cooling flow of working liquid still has to be supplied to the working circuit W through the inlet 9 and inlet ports 11 in order to carry away the heat generated by 'windage' losses caused by the air vortex set up within the working circuit W. The cooling liquid itself tends to follow a vortex path within the working circuit W and accordingly has open and direct access to the tubes 12. In this way, the working liquid fed to the working circuit W for cooling purposes is continuously removed from the working circuit to the scoop chamber from which it leaves through sealed labyrinth L. Under these conditions, this action is assisted by the scoop 16 and particularly its extension 17 which together form a scooping orifice for liquid travelling in the general direction of the arrow 19 (FIGS. 3, 5).

Figure 6:
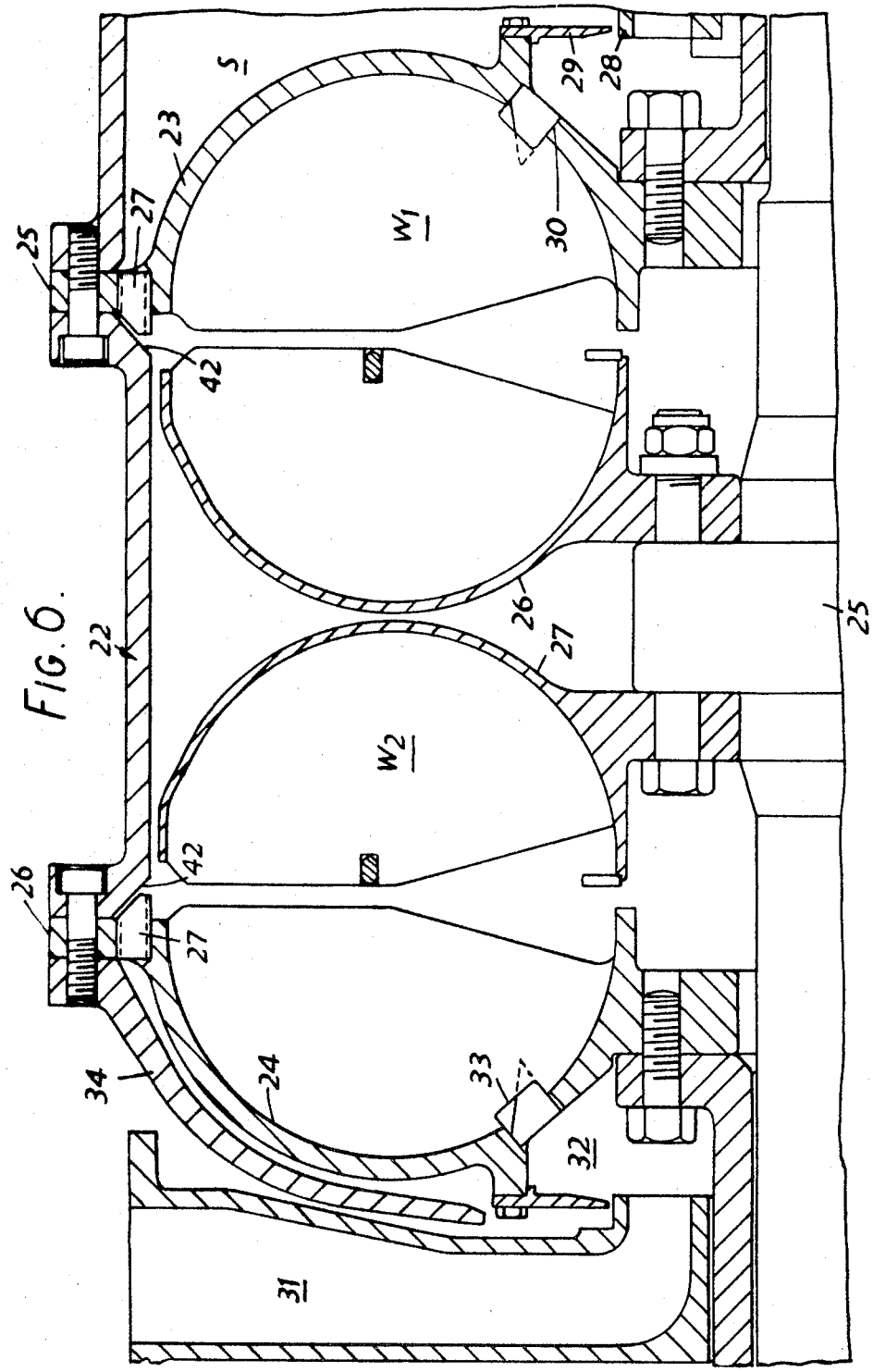
FIG. 6 is a view corresponding to FIG. 1 of a double-circuit fluid coupling.

The coupling shown in FIG. 6 is of the double working circuit type having two working circuits W1 and W2. The impeller casing 22 carries two vaned impellers 23 and 24 while the output shaft 25 carries two runners 26 and 27 back-to-back. The working circuit W1 is defined between the impeller 23 and the runner 26 while the working circuit W2 is defined between the impeller 24 and the runner 27. The working circuit W1 is supplied with working liquid from a conduit 28 and collecting ring 29 through inlet ports 30 while the working circuit W2 is supplied with working liquid from a conduit 31 and collecting ring 32 through inlet ports 33. The quantity of working liquid in the working circuits is controlled by a trimming scoop (not shown) working in a scoop chamber S, the trimming scoop serving to remove excess working liquid supplied through the inlet ports 30 and 33 thus maintaining a cooling flow of oil through the working circuits in conventional manner.

Each of the impellers 23 and 24 has a flange 25 and 26 respectively at its radially outer periphery. The radially outer portions of these flanges are used for bolting the flanges to the casing 22 while the radially inner portions of these flanges accommodate tubes 27 which serve to remove working liquid from the respective working circuits when the casing 22 is stationary and the output shaft 25 and runners 26 and 27 are still being rotated by the load to which the output shaft 25 is coupled.

In order to prevent loss of working liquid through the tubes 27 from the working circuit W2 under normal working conditions, that is when the casing 22 is rotating and the coupling is driving the output shaft 25, the casing 22 carries an annular end section 34. When the casing 22 is rotating at its normal working speed, the centrifugal head is generated in the space between the end member 34 and the impeller 24 and this head opposes loss of working liquid through the tubes 27 from the working circuit W2. When however the casing 22 is stationary, there is no centrifugal head opposing the removal of liquid from the working circuit W2 by the tubes 27.

A suitable form for the tubes 27 is shown in FIGS. 7 to 10. As seen in FIGS. 6, 7, 9 and 10, the portion of each tube projecting from its flange 25 or 26 is cut away at an angle of 45° at 41 to conform generally to a correspondingly shaped shoulder 42 on the casing. In addition, as shown in FIGS. 8 and 10, one half of this projecting portion is cut away at an axial plane of the tube which also passes through the axis of the coupling. The resulting portion 43 acts as a scoop to collect working liquid and feed it into the tube 27 when the casing 22 is stationary and the output shaft 25 is rotated by the load, while a cooling flow of liquid is passed through the working circuits.

It will be noted that in the coupling shown in FIGS. 6 to 10, the tubes 27 lie wholly outside the working circuits W1 and W2 whereas in the construction shown in FIGS. 1 to 5, the tubes 12 project into the working circuit at its outer profile diameter thereby marginally reducing the overall external diameter of the coupling assembly.

In order to assess the effectiveness of the tubes 12 (FIGS. 1 to 5) and 27 (FIGS. 6 to 10), tests were carried out with the impeller assembly held stationary. The runner assembly was then driven at various speeds and a cooling flow of working liquid was suplied to the coupling. In general, it is found that in fluid couplings the horsepower input to the coupling is equal to K multiplied by the fifth power of the diameter of the working circuit in meters and by the cube of the input speed measured in hundreds of revolutions per minute, K being effectively a dimensionless constant.

Tests were carried out first of all with a coupling of the kind shown in FIG. 1 without the scoop tubes 12. The 'drive-back' torque was measured at three speeds, a high speed corresponding to 75 percent of full working speed and at 'low' and 'extra low' speeds corresponding to 20 and 5 percent respectively of full working speed. It was found surprisingly that 'K' for such an arrangement was not dimensionless since it varied with the runner speed. Supposing that the actual value K equals $k_1 \times K_0$ where $K_0$ is the valve of K for the original design at the 'high speed,' then it was found that the values of $k_1$ at the 'high,' 'low' and 'extra low' speeds were respectively 1.00, 3.63 and 7.37. During these tests, it was observed that the cooling oil was being ejected through the bore of the scoop chamber S and out through the labyrinth system indicated generally at L in FIG. 1. In an attempt to assist this ejection of the cooling oil, and thereby reduce the value of $k_1$ and hence of K, the radial clearance between the scoop casing bore and the stationary manifold formed by the passage 9 was increased from 0.0015D to 0.014D and $k_1$ was then determined for the 'high,' 'low' and 'extra low' speeds obtaining values of 0.96, 2.91 and 2.09. It was thus apparent that significant improvement was only obtained at lower speeds by this measure.

The tubes 12 were then installed in the coupling, and the values of $k_1$ again determined at the three speeds and were found to be respectively 0.19, 0.80 and 0.14 representing a substantial reduction in the 'drive back' torque at all three speeds. In order to confirm the importance of the orientation of the scoop ends of the tubes 15, further values of $k_1$ were determined with the runner driven in the opposite direction of rotation. These values were respectively 1.95, 3.63 and 3.41, thereby confirming the importance of the orientation of the scoops. THe results are summarized in Table I, the size of the cooling oil flow being small, i.e. the ratio of gallons per minute through flow to total gallons required to fill the working circuit was about 25 percent.

TABLE I - Values of $khd\ 1$

| Runner Speed | High | Low | Extra Low |
|---|---|---|---|
| Original Design | 1.00 | 3.63 | 7.37 |
| Large Scoop Chamber/Manifold clearance | 0.96 | 2.91 | 2.09 |
| Large clearance plus Scoop Ended Tubes: | 0.19 | 0.80 | 0.14 |
| Large Clearance plus Scoop Ended Tubes. Runner Driven in Opposite direction | 1.95 | 3.63 | 3.41 |

SImilar tests were carried out with another fluid coupling of different mechanical design, and the following results (Table IIa) were obtained for a small cooling oil flow (about 30percent) and a large cooling flow (Table IIb) of about 170 percent (again measured in gallons per minute) with a percentage of the working circuit capacity. In this instance, the values of $k_2$ are tabulated, $k_2$ having the same significance in these test results as the factor $k_1$ in the previous investigation. With this coupling, a further test was carried out with the scoop ended tubes, and with the oil escape path from the scoop chamber bore restricted, to ascertain whether this had any influence on the results already obtained with this design.

Tabulations of Values of $k_2$

TABLE II(a) Small Cooling Oil Flow

| Runner Speed | High | Low | Extra Low |
|---|---|---|---|
| Original Design | 1.00 | 6.09 | 68.2 |
| Scoop Ended Tubes | 0.92 | 4.34 | 37.9 |
| Scoop Ended Tubes and Scoop Casing closed in | 1.08 | 4.92 | |

TABLE II(b) Large Cooling Oil Flow

| Runner Speed | High | Low | Extra Low |
|---|---|---|---|
| Original Design | 2.08 | 14.5 | 118 |
| Scoop Ended Tubes: | 1.50 | 6.92 | 75.9 |
| Scoop Ended Tubes and Scoop Casing closed in | 1.67 | 8.08 | |

It will be seen from these results that the 'scoop ended tubes' are effective at both small and large cooling oil flows in reducing the 'drive back' torque, and that closing the opening at the scoop chamber casing bore has little effect at the 'low' and 'high' speeds.

If desired, some of the tubes 12 or 27 may have their scoops facing in the opposite direction to the others. Thus, alternate scoops could face in opposite directions to cover the various modes of maneuvering in a marine transmission while giving identical ahead and astern coupling constructions. When the direction of drive is reversed, an equal number of scoop orifices are still facing into the new direction of vortex flow, thereby keeping the working circuit substantially empty.

I claim:

1. A controllable-filling hydrodynamic power drive comprising circuit elements, including an input element and an output element, the circuit elements defining a toroidal working circuit into which a flow of cooling liquid can be fed when the input element is stationary, wherein the boundary wall of the working circuit includes one or more outlets provided with collecting scoops facing into, for interception of, that vortex flow which is set up within the working circuit when the output element is rotating, the input element is stationary and a flow of cooling liquid is supplied to the working circuit.

2. A hydrodynamic power drive according to claim 1, wherein the input element and the output element are adjacent each other at the radially outermost portion of the working circuit and the collecting scoop or scoops is/are located in this portion of the working circuit.

3. A hydrodynamic power drive according to claim 1, wherein the or each scoop comprises a tube cut away at one side to leave the other side projecting.

4. A hydrodynamic power drive according to claim 3, wherein the projecting side of the or each tube carries an end wall.

5. A hydrodynamic power drive according to claim 1, wherein the input element and the output element are adjacent each other at the radially outermost portion of the working circuit and the collecting scoop or scoops is/are located in this portion of the working circuit and the or each scoop comprises a tube cut away at one side to leave the other side projecting.

6. A hydrodynamic power drive according to claim 5, wherein the or each collecting scoop is mounted in the input element at a gap between the input and output elements.

7. A hydrodynamic power drive according to claim 6, herein the end of the collecting scoop is adjacent an inner wall surface of an input element casing structure.

8. A hydrodynamic power drive according to claim 1, wherein each outlet discharges into a tube or chamber leading into a radially inner portion of a casing structure which rotates with the input element.

9. A hydrodynamic power drive according to claim 1, having a plurality of collecting scoops wherein some of the collecting scoops face in the opposite direction of rotation to the other collecting scoops.

* * * * *